US008417708B2

(12) United States Patent  
Chidlovskii

(10) Patent No.: US 8,417,708 B2  
(45) Date of Patent: Apr. 9, 2013

(54) AVERAGE CASE ANALYSIS FOR EFFICIENT SPATIAL DATA STRUCTURES

(75) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 763 days.

(21) Appl. No.: 12/367,638

(22) Filed: Feb. 9, 2009

(65) Prior Publication Data

US 2010/0205181 A1    Aug. 12, 2010

(51) Int. Cl.  
*G06F 7/00* (2006.01)

(52) U.S. Cl.  
USPC .......................................... 707/743

(58) Field of Classification Search .................... 707/743  
See application file for complete search history.

(56) References Cited

U.S. PATENT DOCUMENTS 6,161,105 A * 12/2000 Keighan et al. ....................... 1/1

OTHER PUBLICATIONS

Chidlovskii et al., "Scalable Feature Selection for Multi-class Problems", U.S. patent application filed Apr. 23, 2008.
Abramowitz, et al., Handbook of Mathematical Functions, U.S. Department of Commerce, Chapter 5, pp. 228-237, 1972.
Bayer, XML Databases: Modeling and Multidimensional Indexing, Proc. DEXA Conference, Munchen, Abstract, 2001.
deBerg, et al., Computational Geometry, 2nd Revised Edition, Springer-Verlag, Chapters 5 and 14, 2000.
Devroye, et al., An Analysis of Random d-Dimensional Quad Trees, SIAM J. Comput., 19(5), 821-832 (1990).
Flajolet, et al., Analytic Variations on Quadtrees, Acta Informatica, 10, 473-500 (1993).

Freeston, Advances in the Design of the BANG File, Lect. Notes Comp. Sci., 367, 322-338 (1989).
Hardy, et al., Inequalities, Cambridge University Press, Chapter 3, 1988.
Jagadish, et al., VBI-Tree: A Peer-to-Peer Framework for Supporting Multi-Dimensional Indexing Schemes, Proc. 22nd Intl. Conference on Data Engineering (ICDE), 34-41 (2006).
Kemp, The Expected Number of Nodes and Leaves at Level K in Ordered Trees, Lect. Notes Comp. Sci., 145, 153-163 (1982).
Lin, et al., Perfect KDB-Tree: A Compact KDB-Tree Structure for Indexing Multidimensional Data, In Proc. 3rd Intl. Conference on Information Technology and Applications, vol. 2, 411-414 (2005).
Luk, et al., A Survey in Indexing and Searching XML Documents, J. American Society for Information Science and Technology, 53(6), 415-437 (2002).

(Continued)

*Primary Examiner* — Robert W. Beausoliel, Jr.  
*Assistant Examiner* — Nirav K Khakhar  
(74) *Attorney, Agent, or Firm* — Fay Sharpe LLP

(57) ABSTRACT

A computer performed method models a spatial index having n spatial regions defined in a multidimensional space using a tree-based model representing an infinite number of arrangements of n spatial regions in the multidimensional space allowable by the spatial index using a finite number of tree representations, computes an average retrieval complexity measure for content retrieval using the spatial index based on the tree based model, and provides a spatial index recommendation based on the average retrieval complexity measure. In some embodiments a spatial index selection module selects the spatial index based on average retrieval complexity measures for candidate spatial indices that are functionally dependent upon a number of spatial regions to be defined by the spatial index.

19 Claims, 7 Drawing Sheets

OTHER PUBLICATIONS

Nakamura, et al., A Balanced Hierarchial Data Structure for Multi-dimensional Data with Highly Efficient Dynamic Characteristics, IEEE Trans. Knowl. Data Engineering. 5(4), 682-694 (1993).

Nieverelt, et al., The Grid File: An Adaptable Symmetric Multikey File Structure, ACM Trans. Database Syst., 9(1), 38-71 (1984).

Ouksel, The Interpolation-Based Grid File, Proc. 4th ADM SIGMOD Symp. on Database Systems, pp. 20-27 (1985).

Ouksel, et al., A Robust and Efficient Spatial Data Structure: The Nested Interpolation-Based Grid File, Acta Informatica, 29, 335-373 (1992).

Samet, Foundations of Multidimensional and Metric Data Structures Reading, Morgan Kaufmann Publishers, Chapter 1, pp. 1-190, 2006.

* cited by examiner

AVERAGE CASE ANALYSIS FOR EFFICIENT SPATIAL DATA STRUCTURES

BACKGROUND

The following relates to the information processing arts, information storage and retrieval arts, spatial mapping arts, and related arts.

Spatial databases store content with its spatial information maintained. As used herein, the term "spatial" and the like encompasses any of two-dimensional, three-dimensional, four-dimensional, five-dimensional, or more generally d-dimensional space. The term multidimensional space is used herein to denote any of two-dimensional, three-dimensional, four-dimensional, five-dimensional, or more generally d-dimensional space. The term "record" is used herein as a general term encompassing any information having spatial localization respective to a point, area, or other portion of the multidimensional space.

By storing content organized as records with the spatial information maintained, it is possible to retrieve records within a selected area of space, or records that are within a defined distance of a point of interest, or so forth. For example, a spatial database may be used in a geographical information system (GIS), with each record representing a point of interest such as a city, a hotel, a country, a state, a restaurant, or so forth. Information can be retrieved, such as: the identity of all restaurants within a two-mile radius of a current location; a nearest city to a given city; or so forth. Spatial databases are also used in other applications such as in computer graphics, computational geometry applications, in peer-to-peer computing, in time series processing, in efficient feature selection for clustering and categorization applications, and in the efficient storage and indexing of deeply-nested XML documents or other structured documents.

Spatial databases employ spatial indices that enable the content to be retrieved in a systematic fashion. A diversity of spatial indices have been developed, such as quadtrees, octrees, UB-trees, R-trees, k-d trees, nested interpolation-based grid (NIBG) indices, and so forth. These spatial indices partition a multidimensional space into spatial regions each containing no more than b points. Each partition region containing b or fewer points is also sometimes referred to as a "data bucket". As more points are added to the spatial database, further partitioning may be employed to accommodate the new data points with each data bucket containing no more than b points. Conversely, if data points are removed then a "reverse" partitioning or region-joining process may optionally be employed to combine partitions. Region joining may also be employed for other tasks, such as to simplify the indexing structure. The spatial index enables rapid identification of records from a selected region or regions of the spatial index, enabling rapid retrieval of records defined at least in part by spatial location.

The efficiency of content retrieval using a spatial database is dependent upon the choice of spatial index. Different spatial indices may be more or less efficient for different spatial databases. Further, the computational complexity of a given retrieval operation may be strongly dependent upon the specific spatial locale from which the content is to be retrieved.

Regardless of the choice of spatial index, however, content retrieval is highly computationally intensive for a large spatial database. Moreover, the initial spatial indexing is also computationally complex, making it inconvenient and sometimes impractical to switch or convert to a new type of spatial index.

Accordingly, it is advantageous to choose an efficient spatial index for generating a given spatial database. An intuitive definition of "efficiency" is the average retrieval complexity for a retrieval operation. By choosing a spatial index providing low (ideally, lowest) average retrieval complexity, the efficiency of the resulting spatial database is enhanced.

Unfortunately, existing techniques for estimating or measuring average retrieval complexity are less than ideal. Average case complexity has been estimated based on first principles for a few spatial indices, including k-d trees and quadtrees. See Devroye et al., "An Analysis of Random d-Dimensional QuadTrees", SIAM J. Comput. vol. 18 no. 5 pp. 821-32(1990); Flajolet et al., "Analytic Variations on Quadtrees", Acta Informatica vol. 10 pp. 473-500 (1993). For other types of spatial indices, the general solution has heretofore been to execute a (hopefully representative) series of simulations. See Nakamura et al., "A Balanced Hierarchial Data Structure for Multidimensional Data with Highly Efficient Dynamic Characteristics", IEEE Trans. Knowl. Data Engineering vol. 5 no. 4 pp. 682-94(1993). Simulations are computationally intensive, however, and as an empirical approach do not provide conceptual insight or assure that the average retrieval complexity has been reasonably approximated.

BRIEF DESCRIPTION

In some illustrative embodiments disclosed as illustrative examples herein, a computer performed method is disclosed for recommending a spatial index for a spatial database, the method comprising: modeling a spatial index having n spatial regions defined in a multidimensional space using a tree-based model representing an infinite number of arrangements of n spatial regions in the multidimensional space allowable by the spatial index using a finite number of tree representations; computing an average retrieval complexity measure for content retrieval using the spatial index based on the tree based model; and providing a spatial index recommendation based on the average retrieval complexity measure.

In some illustrative embodiments disclosed as illustrative examples herein, a storage medium is disclosed that stores instruction executable by a digital electronic device to perform a method for assessing average retrieval complexity when using a selected spatial index that decomposes a multidimensional space into a selected number of spatial regions, the method comprising: modeling an infinity of arrangements of the selected number of spatial regions which are allowed by the selected spatial index using a finite number of tree representations; and computing an average retrieval complexity measure indicative of average retrieval complexity based on the tree based model.

In some illustrative embodiments disclosed as illustrative examples herein, a spatial information system is disclosed, comprising: an indexing module configured to construct a directory indexing records of a spatial database using a spatial index defining spatial regions whose indexing can be represented by nodes of a tree structure; and a spatial index selection module configured to select a spatial index for use by the directory construction module based on average retrieval complexity measures for candidate spatial indices that are functionally dependent upon a number of spatial regions to be defined by the spatial index.

DETAILED DESCRIPTION

The following terms are used herein. As used herein, the term "multidimensional space" indicates a space having at least two dimensions. For example, the term "multidimensional space" encompasses two-dimensional spaces, three-dimensional spaces, four-dimensional spaces, five-dimensional spaces, and so forth. Such a space may be normalized along each dimension, in which case it is denoted herein as $U^d=[0,1)^d$ where d denotes the number of dimensions. The term "record" denotes content, such as a point, a location, a file, a description, an image, a location name, or any other content localized within the multidimensional space. The record includes both the content and its localization information. An illustrative record is sometimes denoted herein by the symbol v.

Figure 1:
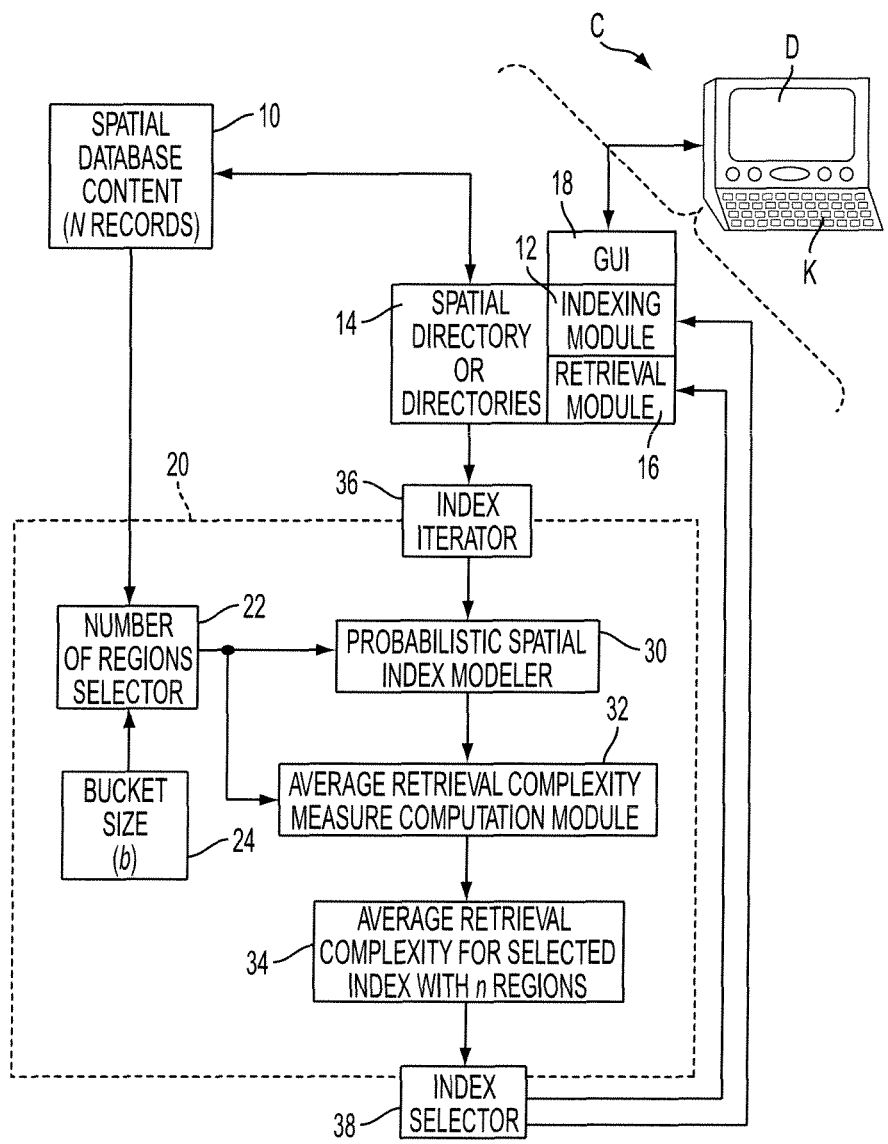
FIG. 1 diagrammatically shows an illustrative spatial information system including components for selecting an efficient spatial index and indexing a spatial database using the selected spatial index.

With reference to FIG. 1, an illustrative spatial information system organizes spatial database content 10, which includes N records. An indexing module 12 is configured to construct at least one spatial directory 14 that indexes the N records of the spatial database using a spatial index defining spatial regions whose indexing can be represented by nodes of a tree structure. In some embodiments, it is contemplated to construct more than one spatial index and for the content retrieval module 16 to use a selected spatial index for a given retrieval operation. In general, a user interface 18, preferably graphical (i.e., a graphical user interface or GUI) enables a user to specify the spatial database content 10, cause the indexing module 12 to index the spatial database content 10 so as to create a spatial database, and to define and initiate content retrieval operations performed by the content retrieval module 16.

The choice of spatial index generally has an impact on the efficiency of content retrieval operations performed by a content retrieval module 16. Accordingly, a spatial index selection module 20 is configured to select a spatial index for use by the directory construction module. The selection of the spatial index is based on average retrieval complexity measures for candidate spatial indices. The candidate spatial indexes may include, for example: a quadtree index, an octree index, a UB-tree index, an R-tree index, a k-d tree index, and a nested interpolation-based grid (NIBG) index.

It is shown herein that the average retrieval complexity measure is functionally dependent upon a number of spatial regions to be defined by the spatial index. Accordingly, the spatial index selection module 20 includes a number of spatial regions selector 22 that estimates the number of spatial regions, denoted herein by n. For N records and a bucket size b 24 denoting a maximum number of records allowable in each spatial region, it follows that n n≧(N/b). To estimate the number of spatial regions n more quantitatively, in some embodiments the formula n=F(N/b) is used, where F denotes the statistical average "fullness" of each spatial region or bucket, with F typically having a value in the range [0,1] and typically having a value of about one. The value of F may be a constant, or may be user-selectable, or may be a function of the number of records N, or so forth.

The spatial index selection module 20 further includes a probabilistic spatial index modeler 30 and an average retrieval complexity measure computation module 32 that outputs an average retrieval complexity 34 for the selected index and the selected number or regions n. As is known in the art, in general an infinite number of arrangements of n spatial regions in the multidimensional space are allowable by most spatial indexes used in spatial databases. This condition holds true, for example, for quadtree, octree, UB-tree, R-tree, k-d tree, and NIBG indexes. As a result, a closed form computation of an average retrieval complexity measure has generally been regarded as difficult or impossible, and resort has been made to Monte Carlo simulations or other empirical estimation techniques.

As disclosed herein, however, the spatial index selection module 20 operates based on the recognition that many spatial indexes allow for the n spatial regions in the multidimensional space to be represented by a tree respresentation in which the nodes of the tree correspond to the n spatial regions and branches of the tree represent spatial relationships, such as containment, between the various spatial regions. This condition also holds true, for example, for quadtree, octree, UB-tree, R-tree, k-d tree, and NIBG indexes. It is recognized herein that although an infinite number of arrangements of n spatial regions in the multidimensional space may be allowable by the spatial index, the number of tree representations of this infinite number of arrangements is finite. This is because each tree representation can correspond to an infinite number of arrangements of n spatial regions. In view of this, the spatial index selection module 20 operates by (i) the probabilistic spatial index modeler 30 modeling the infinite number of arrangements of the n spatial regions in the multidimensional space by a finite number of tree representations, and (ii) the average retrieval complexity measure computation module 32 computing the average retrieval complexity measure 34 based on the finite number of tree representations. This converts an unbounded problem into a bounded problem that can be solved in a closed-form for a wide range of spatial indexes.

To perform the average retrieval complexity estimation for a plurality of candidate spatial indexes, the spatial index selection module 20 includes an index iterator 36 that applies the computation modules 30, 32 to each successive candidate spatial index to output a value for the average retrieval complexity measure 34 for each candidate spatial index. A spatial index selector 38 then selects the spatial index to be used by the indexing module 12 and by the retrieval module 16 based on the average retrieval complexity measures 34 for the candidate spatial indexes.

The aforementioned components 12, 16, 18, 20, and information storages 10, 14 can be embodied in various ways. In the embodiment shown in FIG. 1, a computer C has memory or storage device(s) such as random access memory (RAM), a hard drive, an electrostatic memory, an optical memory, or so forth, or has access to memory or storage on an Internet server, local area network (LAN), or the like, that embodies the information storages 10, 14, and also has a digital processor and suitable programming (for example stored on one of the aforementioned memory or storage device(s)) to implement the components 12, 16, 18, 20. The user interface 18 includes suitable user input devices such as an illustrated keyboard K, or a mouse or other pointing device, or so forth, for receiving input from a user, and also includes a display D or other output device for outputting information of interest to a user such as the results of a spatial database query performed by the retrieval module 16. In other embodiments, the components 12, 16, 18, 20, and information storages 10, 14 may be embodied as an Internet server with the user interface employing a remote terminal enabling user input and output via the Internet or via a local area network (LAN).

The aforementioned components 12, 16, 18, 20, and information storages 10, 14 can additionally or alternatively be embodied as a storage medium storing instructions executable by a digital processor to perform the operations of the components 12, 16, 18, 20 and to effectuate creation and updating of the information storages 10, 14. The storage medium can be, for example, one of or a combination of: a random access memory (RAM); a magnetic data memory such as a hard disk drive; an optical memory such as an optical disk; an electrostatic memory such as a FLASH memory; a storage device associated with an Internet-based or LAN-based server; or so forth.

To provide further illustration, some examples are disclosed of operation of the spatial index selection module 20 as applied to estimating an average retrieval complexity measure for a nested interpolation-based grid (NIBG) index. The NIBG index is described and used herein as an illustrative example of a spatial index defining spatial regions whose indexing can be represented by nodes of a tree structure. However, it is to be understood that the average retrieval complexity estimation techniques disclosed herein are applicable to other types of spatial indexes that define spatial regions whose indexing can be represented by nodes of a tree structure, such as quadtree indexes, octree indexes, UB-tree indexes, R-tree indexes, k-d tree indexes, and so forth.

The nested interpolation-based grid (NIBG) index is a synthesis of the partitioning scheme of interpolation-based grid file (see, for example, Ouksel, "The Interpolation-Based Grid File", Proc. 4th ACM SIGMOD Symp. on Database Systems, pp. 20-27 (1985)) and the nesting concept of the BANG file (see, for example, Freeston, "Advances in the Design of the BANG File", Lect. Notes Comp. Science. 367, 322-338 (1989)). The approach of the NIBG index is first to partition the d-dimensional hypercube $U^d=[0,1)^d$ forming the bounded search space into a finite number of rectangular subspaces which exhaust the search space, then to use these subspaces for defining nested regions efficiently using the storage use, and finally to design a directory for these regions which guarantees the most efficient retrieval. Generally the indexing includes developing the physical data organization for a set of records given by d-dimensional vectors $k=(k_0, \ldots, k_{d-1})$ whose components represent values for key attributes $A_0, A_1, \ldots, A_{d-1}$. It is assumed that each attribute domain is linearly ordered and bounded and that each attribute value can be represented by a rational number in its specific domain interval. By rescaling, each domain can be represented by the half open interval [0,1). Thus each record to be represented in the data file can be viewed as a point in the d-dimensional hypercube $U^d=[0,1)^d$ forming the transformed data space where the i-th axis corresponds to attribute $A_i$, i=0, ..., (d−1). The scaling allows representation of various classes of objects such as are processed in image processing, spatial and geographic databases, computational geometry, or other spatial database applications.

Recursive partitioning of the multidimensional space $U^d=[0,1)^d$ to define subspaces is done as follows when using NIBG indexing. The NIBG partitioning of the whole search space $U^d$ into rectangular subspaces consists in a cyclical or recursive splitting of each subspace in half along the next axis, starting at axis 0. The process is repeated until each of the resulting subspaces contains no more than b points, where b is the number of data points which fit in a data bucket. At the step l of the partitioning process, all the subspaces covering $U^d$ after step (l−1)-th are split in half along axis (l mod d). Thus, after l partition steps, there exist $2^l$ subspaces which cover the multidimensional space $U^d$. The set of subspaces covering $U^d$ after the l-th split is denoted as SP(l). The process of the search space decomposition can be illustrated by the binary tree, whose nodes on level l represent the subspaces of set SP(l). Note that the area covered by each subspace in SP(l) is $(1/2)^l$ and the extension of the subspace along axis i is $(1/2)^{l_i}$, where $l_i$ is referred to herein as an internal partitioning level and equals the number of splits at axis i, i=0, ... (d−1) It follows that $$l = \sum_0^{d-1} l_i.$$

Given the space partition level l, the internal partition levels $l_i$, $0 \leq i < (d-1)$ are determined as follows. Let $L=[l/d]$ and $r=l-L\cdot d$. Then $l_i=L+1$ for $0 \leq i < r$ and $l_i=L$ for $r \leq i < d$. At the space partition level l, the set SP(l) includes all subspaces of the form:

$$\left[\frac{x_0}{2^{l_0}}, \frac{x_0+1}{2^{l_0}}\right) \times \left[\frac{x_1}{2^{l_1}}, \frac{x_1+1}{2^{l_1}}\right) \times \ldots \times \left[\frac{x_{d-1}}{2^{l_{d-1}}}, \frac{x_{d-1}+1}{2^{l_{d-1}}}\right) \quad (1)$$

for all integers $x_i$ such that $0 \leq x_i < 2^{l_i}$ for $0 \leq i < d$.

Figure 2:
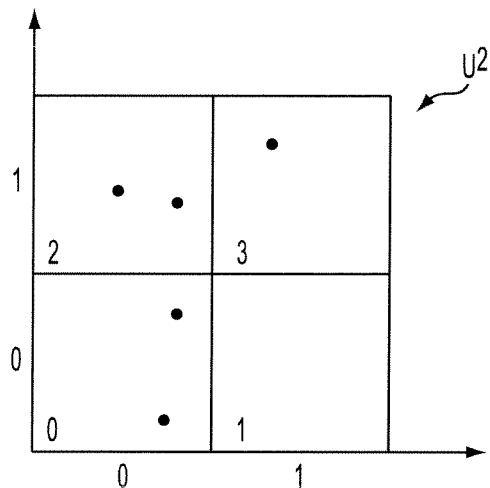
FIG. 2 diagrammatically shows partitioning of a (normalized) two-dimensional space $[0,1)^2$ into sub-spaces using a nested interpolation-based grid (NIBG) index with a bucket size of 2.
Figure 3:
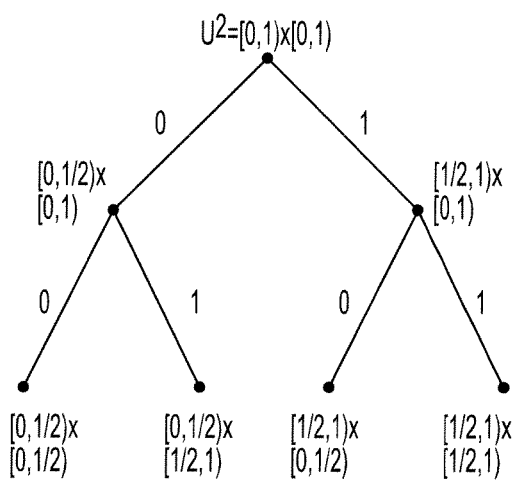
FIG. 3 diagrammatically shows a decomposition binary tree corresponding to the partitioning of FIG. 2, where the nodes represent sub-spaces and the edges represent recursive partitioning.

FIGS. 2 and 3 diagrammatically depict an example of partitioning for two-dimensional data in a two-dimensional space $U^2=[0,1)^2$ with b=2. During the process of decomposition, the following sets of subspaces are obtained $$SP(0)=\{[0,1)\times[0,1)\}$$

$$SP(1)=\{[0,1/2)\times[0,1),[1/2,1)\times[0,1)\}$$

$$SP(2)=\{[0,1/2)\times[0,1/2),[0,1/2)\times[1/2,1),[1/2,1)\times[0,1/2),[1/2,1)\times[1/2,1)\}$$

For set SP(2) the parameters L=1, r=0, $l_1=l_2=1$ apply, and subspace area equals 1/4 (where the normalized space $U^2=[0,1)^2$ has unit area). FIG. 2 depicts the partitioned space $U^2=[0,1)^2$, while FIG. 3 depicts a decomposition binary tree corresponding to the partitioning shown in FIG. 2.

Each subspace in the form given by Equation (1) is uniquely identified by the d-tuple $x=(x_0, x_1, \ldots, x_{d-1})$ and space partition level l. Therefore, pair (x,l) identifies the subspace. The subspace contains a vector $v=(k_0, \ldots, k_{d-1})$ if and only if $x_j=\lfloor k_j \cdot 2^{l_j} \rfloor$, where $l_j$ is the internal partition level at axis j, $0 \leq j < d$. For example, the pair ((1,0),2) identifies the subset $[1/2,1)\times[0,1/2)$ of SP(2). To provide a further example, let the vector v equal (0.013,0.7) and the space partition level be 2. Since $l_0=l_1=1$, the vector v is in the subspace identified by ((0,1),2).

Instead of using the notation of d-tuple x, it is more convenient to number all the subspaces of SP(l) from 0 to $2^l-1$. Such numbering suitably reflects the partitioning process and retains spatial locality information during the splits. A suitable numbering scheme employs bit interleaving (see, for example, Ouksel, "The Interpolation-Based Grid File", Proc. 4th ACM SIGMOD Symp. on Database Systems, pp. 20-27 (1985)). In this approach, let (x,l) identify a subspace in SP(l), where $x=(x_0, \ldots, x_{d-1})$. Also, let $x_{i,j}$ denote the j-th digit in the binary representation of $x_i$ starting from the right, $0 \leq i < d$ and $0 \leq j < l_i$. Then the set SP(l) can be mapped into set $\{0, 1, \ldots, 2^l-1\}$ in such a manner that subspace (x,l) corresponds to an integer number $MP_l(x)$ according to:

$$MP_l(x) = \sum_{i=0}^{d-1} 2^i \sum_{j=0}^{l_i-1} 2^{d(l_i-1-j)} x_{i,j}. \quad (2)$$

A binary representation of $MP_l(x)$ is obtained by interleaving the bits $x_{i,j}$ of the binary representations of $x_i$'s value, $1 \leq i \leq d-1$, $0 \leq j \leq l_i-1$.

Figure 4:
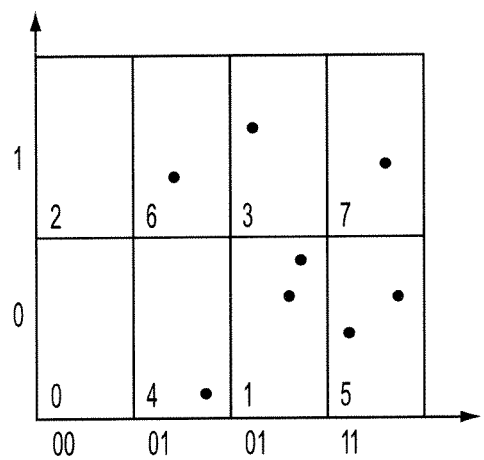
FIG. 4 diagrammatically shows further recursive partitioning of the space $[0,1)^2$ of FIG. 2, after two splits along the horizontal axis and one split along the vertical axis.

With reference to FIG. 4, the partitioning of the multi-dimensional space $U^2=[0,1)^2$ with space partition level l=3 is depicted. For this value of l the values $l_0=2, l_1=1$ are obtained. The subspace $[1/4,1/2)\times[1/2,1)$ determined by $x=(x_0=01_2, x_1=1_2)$ obtains the integer number $MP_3(x)=x_{00}x_{10}x_{01}=110_2=6$. A pair (y,l), $y=MP_l(x)$ is used herein to denote a subspace s in set SP(l).

Subspace s in SP(l) is called an ancestor of subspace s' in SP(l), if subspace s' is completely contained in the subspace s. Also, subspace s' is called a descendant of subspace s. Subspace s in SP(l) is called the nearest ancestor of subspace s' in SP(l), if any ancestor of s' is either s itself or an ancestor of s. For a subspace s=(y,l) in SP(l), the notation $bin_l(y)$ is used herein to denote the inverse binary representation of y of length l. It can be shown (see, for example, Ouksel et al., "A Robust and Efficient Spatial Data Structure: The Nested Interpolation-Based Grid File", Acta Informatica 29, 335-73 (1992)) that a subspace s=(y,l) is an ancestor of subspace s'=(y',l') if and only if $bin_l(y)$ is a proper prefix of $bin_{l'}(y')$.

The subspaces produced at a given space partitioning level are of uniform size and distribution throughout the multidimensional space. However, in most practical cases the spatial database content 10 are not uniformly distributed over the search space and the partitioning methodology produces a substantial number (in some cases, a majority) of subspaces which are empty or sparsely populated. To improve storage utilization it is advantageous to merge sparsely populated subspaces into larger units, called regions, such that each region contains no more than b (the bucket size 24) records. The merging should also be performed in a manner that ensures effective access and manipulation of the spatial data. Some suitable merging techniques for an NIGB index are described, for example, in Ouksel et al., "A Robust and Efficient Spatial Data Structure: The Nested Interpolation-Based Grid File", Acta Informatica 29, 335-73 (1992). After the recursive partitioning and merging operations, the search space $U^d$ is partitioned into n regions of possibly different sizes.

Figure 5:
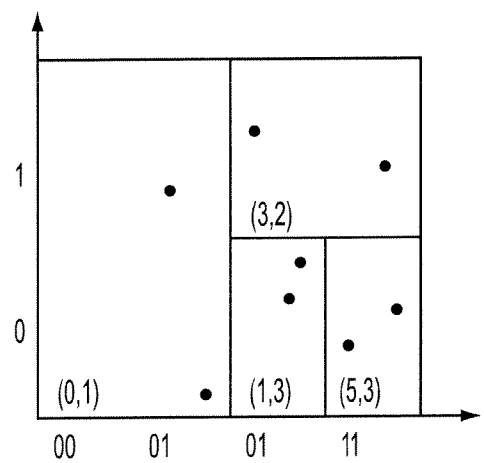
FIG. 5 diagrammatically shows the partitioned space $[0,1)^2$ of FIG. 4 with selected sub-spaces merged so that each region includes at least one and no more than the bucket size (2) points.

With reference to FIG. 5, for example, merging of the subspaces 0, 2, 4, and 6 shown in FIG. 4 produces a larger merged region denoted (0,1) in FIG. 5 containing b=2 records, and merging of subspaces 3 and 7 shown in FIG. 4 produces a larger merged region denoted (3,2) in FIG. 5 also containing b=2 records. Remaining subspaces 1 and 5 of FIG. 4 each contain b=2 records, and accordingly cannot be merged with other (nonempty) regions. As already noted, the number of regions must satisfy the condition $n \geq (N/b)$ where n=(N/b) corresponds to each and every region containing the maximum (i.e., bucket size b) number of records. This is the case in the example of FIG. 5, where N=8, b=2, and n=4. However, in some configurations it may be impossible to merge subspaces in order to satisfy the condition n=(N/b). A trivial example of this is if the number of records N is not evenly divisible by the bucket size b.

In the NIBG indexing approach, each region can be formed from a subspace in $$\bigcup_{l=0}^{\infty} SP(l)$$

but with, possibly, one or more smaller subspaces carved out of this area. In turn, each of these smaller subspaces may be again decomposed into regions. Using an analogy to the decomposition binary tree, a region with holes is represented by a binary subtree from which subtrees corresponding to the holes have been detached. Therefore, each region may be viewed as a subtree whose identifier is associated with the root. This method of forming the regions from subspaces with recursively carved out subspaces is called nesting of the regions.

Figure 6:
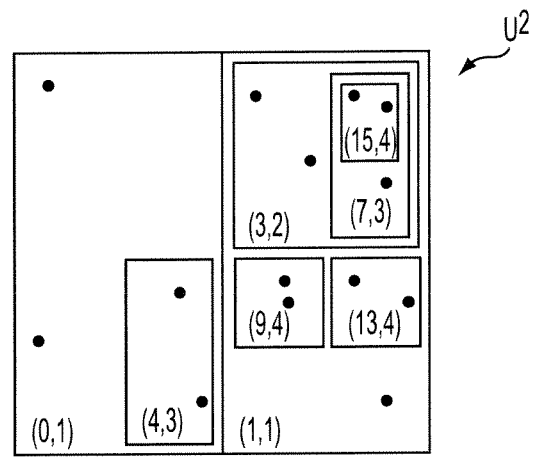
FIG. 6 diagrammatically shows partitioning of a (normalized) two-dimensional space $[0,1)^2$ into regions using a nested interpolation-based grid (NIBG) index with a bucket size of 2, where the recursive partitioning into sub-spaces and merging of subspaces has been performed to ensure that each region includes at least one and no more than the bucket size (2) points.

With reference to FIG. 6, an example is shown of partitioning and containment relationships enforced by the NIBG indexing approach. The illustrative search space $U^2$ is subdivided into the following regions:
subspace (0,1) without subspace (4,3);
subspace (4,3);
subspace (1,1) without (9,4), (13,4) and (3,2);
subspace (9,4);
subspace (13,4);
subspace (3,2) without (7,3);
subspace (7,3) without (15,4); and
subspace (15,4).
This subdivision is uniquely determined by the set of subspace identifiers I={(0,1), (1,1), (3,2), (4,3), (7,3), (9,4), (13,4), (15,4)}.

Figure 7:
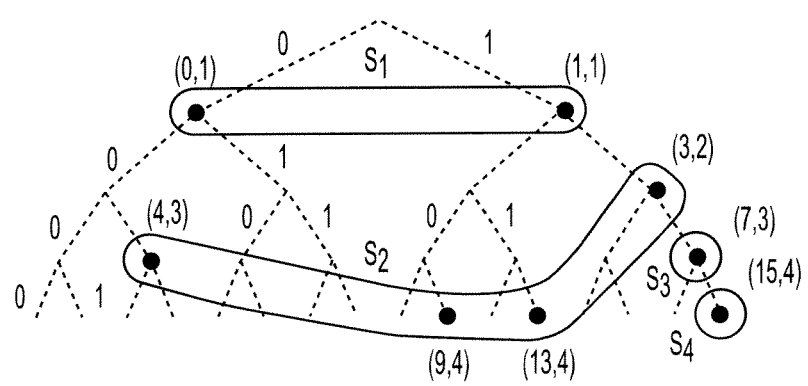
FIG. 7 diagrammatically shows the NIGB index of the space of FIG. 6 with recursive partitioning indicated using dashed lines, regions of the NIBG index indicated by filled dots, and regions that are at the same nesting depth grouped by lasso loop indicators.

With reference to FIG. 7, the generation of the regions depicted in FIG. 6 is illustrated diagrammatically. In FIG. 7, the partitioning of the space into subspaces is depicted by dashed lines. Each split results in to "child" subspaces, so that the recursive partitioning generates a binary tree of branching dashed lines, with the root of each binary split corresponding to a subspace that is split into two "child" subspaces. Each subspace corresponding to a region (possibly having one or more contained subspaces carved out as additional regions) is denoted in FIG. 7 by a filled dot.

The partition of the search space is uniquely described by a set I of subspace identifiers (corresponding to the filled dots of FIG. 7) and conversely, the set of subspace identifiers needed to describe a partition is uniquely determined by the partition. To describe the merging process of the NIBG index in quantitative terms, two relations are defined on the set of subspace identifiers I. First, two subspace identifiers $s=(y,l)$ and $s'=(y',l')$ are referred as connected with relation "[", where $s'[s,$ if $s$ contains $s'$ (or equivalently, if $s$ is an ancestor of $s'$), i.e., $bin_l(y)$ is a proper prefix of $bin_{l'}(y')$. Second, two subspace identifiers $s=(y,l)$ and $s=(y',l')$ are connected with relation "$\prec$", where $s \prec s'$, if $pd(bin_l(y)) < pd(bin_{l'}(y'))$, where the operation pd pads the argument written in the binary representation by the '0' on the right up to the length equal to $\max(l,l')$. For example, $(13,4)$ [ $(1,2)$ because $bin_2(1)=10_2$ is a prefix for $bin_4(13)=1011_2$. Also, $(11,4) \prec (6,3)$ because $pd(bin_4(11))=pd(1011_2)=1011_2$ is greater than $pd(bin_3(6))=pd(011_2)=0110_2$. In general, the relation "[" imposes partial order on the set I while the relation "$\prec$" imposes the total order on the set I.

To determine containment of a multidimensional point v in a subspace s during the exact-match query it is sufficient to obtain the integer number of subspace s' with the maximum search partition level $l_{max}$ contained v. Subspace $s=(y,l)$ contains the point v if and only if $s'$ [ $s$.

Let reg denote a region whose identifier is in set I. The number of subspace identifiers in I which are ancestors of reg plus one is called the nesting depth of reg. If reg has no ancestor then reg has nesting depth 1. The nesting depth h of whole set I is the maximum nesting depth of all regions in I. For each $i=1, \ldots, h$, the symbol $S_i$ is used hereien to denote the set of subspaces in I having the nesting depth i. The subsets $S_i$ form a partition of I and can be organized as a totally ordered list $S=\{S_l, \ldots, S_h\}$. If two subspaces s and s' in I are such that one contains another then they are comparable with relation "[" and cannot be contained in the same subset $S_i$. Moreover, for each subspace identifier s, $s \in S_i, 1 < i \leq h$, there exists $s' \in S_{i-1}$ such that $s$ [ $s'$. Inside each subset $S_i$, all subspace identifiers can be ordered with relation "$\prec$" invoking the padded inverse binary representation of identifiers. Inside $S_i$ no one space identifier can be an ancestor of another. Also, for two identifiers s and s' in $S_i$, if $s' \prec s$ and there exists ancestor s" of s, s [ s", then $s' \prec s"$. Analogously, if $s' \succ s$ and s [ s", then $s" \succ s'$.

These observations allow the NIBG index to be organized in a two level configuration, as an ordered list $S=\{S_l, \ldots, S_h\}$ on the first level, where each subset $S_i, i=1, \ldots, h$, is organized on the second level as an ordered list of subspace identifiers. The first level list is an ordered list of pointers with the order imposed by the order on the $S_i, i=1, \ldots, h$. Each pointer refers to the head of the data structure which represents subset $S_i$ ordered with "$\prec$". Such a data structure may be a balanced tree if index directory is stored in the main memory or a B-tree if secondary storage is employed.

An exact-match query with a searching point v entails searching the subspace which identifier has the deepest space partition level among subspaces. Therefore, inside balanced tree or B-tree storing subsets $S_i$, retrieval is performed with the subspace identifier $s(v)$ of current maximum search partition level $l_{max}$ of subspace containing a searching point. If such identifier is found, the query completes with the checking of corresponding data bucket. Otherwise, if the identifier found is an ancestor of $s(v)$ and data bucket does not contain the searching point, the next step of the binary search is carried out for subspaces $S_j$ with indices greater than i. Otherwise, if the identifier found during the balanced/B-tree traversal is not an ancestor of $s(v)$, the binary search is continued with subsets having indices less than i.

Figure 8:
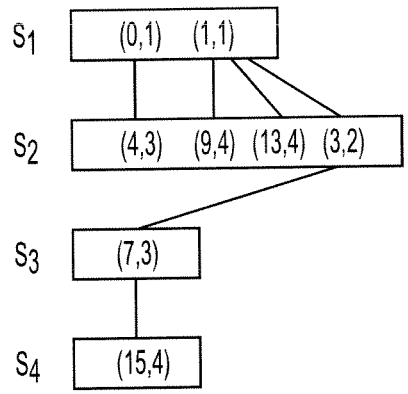
FIG. 8 diagrammatically shows the NIBG index for the space of FIG. 6 with regions at the same nesting depth grouped by lasso boxes.

With reference to FIGS. 6 and 7 and with further reference to FIG. 8, for example, the regions are suitably represented by the set of subspace identifiers I={(0,1),(1,1),(3,2),(4,3),(7,3), (9,4),(13,4),(15,4)}. This set I uniquely determines the ordered list of subsets $S=\{S_1,S_2,S_3,S_4\}$ diagrammatically indicated in FIG. 8, with each subset $S_i$ containing the identifiers of the same nesting depth:

$S_1=\{(0,1),(1,1)\}$;

$S_2=\{(4,3),(9,4),(13,4),(3,2)\}$ $S_3=\{(7,3)\}$; and $S_4=\{(15,4)\}$.

FIG. 7 shows the decomposition binary tree with marked nodes for identifiers from the set I; subsets $S_i$ union the identifiers of the same nesting depth.

Figure 9:
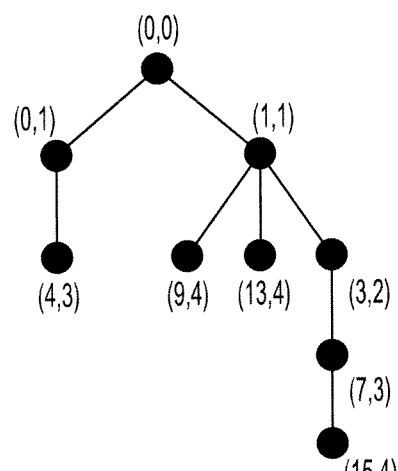
FIG. 9 diagrammatically shows a tree representation of the NIBG index of FIGS. 6 and 8.

With reference to FIG. 8 and further reference to FIG. 9, these subsets are presented with containment relationships. Note that elements inside subsets $S_1$ and $S_2$ are ordered with relation '$\prec$'. For example, for identifiers (4,3) and (9,4) in $S_2$ we get their inverse binary representation $001_3$ and $1001_4$ and pad first one with single bit 0 on the right to reach length of second identifier. Since $0010_2 < 1001_2$, that $(4,3) \prec (9,4)$. FIG. 9 represents the regions as an ordered tree, emphasizing the branching nature of the regions.

Having described the NIBG index that is used herein as an illustrative spatial index, the worst-case retrieval complexity is considered. The worst-case retrieval complexity is not used by the spatial index selection module 20 because it is not generally an effective measure of the average retrieval cost. However, it is useful as a relatively straightforward illustrative retrieval process analysis.

The cost of a retrieval operation using an NIBG index takes into account the cost of search on the each of two levels of the dictionary. Suppose that n identifiers in set I define the partition of the search space into regions and are subdivided in h subsets $S_l, \ldots, S_h$, where the total order on $S=\{S_l, \ldots, S_h\}$ is used to search on the first level and the total order within each subset $S_j$ is used to search on the second level. Note that n is the number of subspace descriptors and not the number of records. (The number of records is denoted as N herein). Binary search on the first level requires an access to at most $\log_2(h+1)$ subsets. In the case when the whole directory is stored in the main memory and $S_j$ is represented by a balanced tree, the traversal of second level data structure costs $O(\log_2 |S_i|)$ and the total worst-case cost is $O(\log_2 h \log_2 n)$. If the bulk of the directory resides in the backup store, then data in each subset $S_i$ is stored as a B-tree of order m and the worst-case bound is $O(\log_2 h \log_m n)$. Since $h=O(n)$, the worst-case cost is $O(\log^2 n)$.

Estimation of the average retrieval complexity is considered next, again using the NIBG index as an illustrative example. In principle, one way to evaluate the average-case cost could entail enumerating all possible NIBG indices having n regions, estimating retrieval cost for each possible index, and averaging the results. However, since a subspace identifier in I is taken from $$\bigcup_{l=0}^{\infty} SP(l),$$

the number of the all possible sets I with n identifiers to evaluate is infinite.

Figure 10:
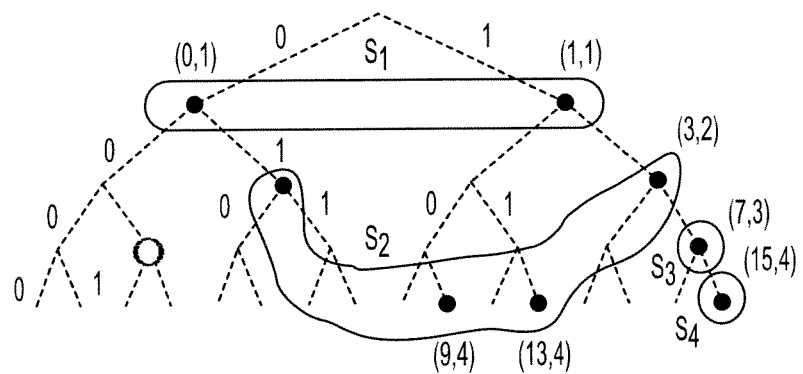
FIGS. 10 and 11 diagrammatically show two additional NIBG indexes which are different from each other and which are different from the NIBG index of FIG. 7; however, all three different NIBG indices of FIGS. 7, 10, and 11 correspond with the same tree representation shown in FIG. 8.
Figure 11:
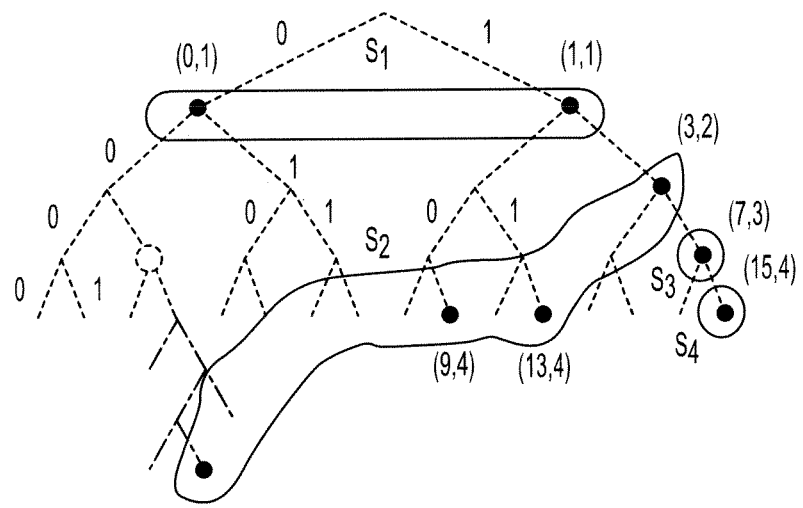

With returning reference to FIG. 7 and with further reference to FIGS. 10 and 11, the problem of an infinity of possible NIBG indexes having n regions is illustrated. Each of FIGS. 7, 10, and 11 diagrammatically show an NIGB index having eight regions. In FIG. 7, one of those regions corresponds to the subspace identifier (4,3), which is a member of the subset $S_2$, is an indirect descendent of the region corresponding to subspace identifier (0,1), and has space partition level l=3. However, in general this region corresponding to subspace identifier (4,3) could be replaced by an infinite number of other possible regions comporting with the NIGB indexing scheme. In FIG. 10, the region corresponding to the subspace identifier (4,3) is replaced by a region that is a direct descendant of the region corresponding to subspace identifier (0,1) and has space partition level l=2. In FIG. 11, the region corresponding to the subspace identifier (4,3) is replaced by a region that has a substantially deeper space partition level l=7, but is still an indirect descendent of the region corresponding to subspace identifier (0,1).

In general, there are an infinite number of regions that could replace the subspace identifier (4,3) and that are (direct or indirect) descendents of the region corresponding to subspace identifier (0,1). Each of these possible regions is "carved out" of the region corresponding to subspace identifier (0,1). While not illustrated, it is readily apparent that similar substitutions can be performed for any deepest region of the NIBG index (that is, for any region having no smaller regions carved out) without changing the descendent/ancestor relationships of the regions. Thus, it is readily apparent that there are an infinity of possible NIBG indexes having eight regions, and more generally there are an infinity of possible NIBG indexes having a given number n regions. Accordingly, the exhaustive approach of enumerating all possible NIBG indices having n regions, estimating retrieval cost for each possible index, and averaging the results is not possible in practice, and accordingly Monte Carlo-type simulations have been employed in the past to generate an estimate the average retrieval complexity. However, such Monte Carlo-type simulations are prone to error if the number of simulations is not large enough to be statistically representative, or if the selection of simulations is not representative, or so forth.

It is recognized herein, however, that while there is an infinity of possible NIBG indexes having n regions, there is a finite number of tree representations of that infinity of possible NIBG indexes. To illustrate, the NIBG indexes of FIGS. 7, 10, and 11 are again considered in conjunction with the tree representation of FIG. 9. As already noted, the tree representation of FIG. 9 corresponds with the NIBG index of FIG. 7. However, it is further seen that the tree representation of FIG. 9 also corresponds with the NIBG index of FIG. 10, and with the NIBG index of FIG. 11. This is a consequence of the fact that the possible replacement regions shown in FIGS. 10 and 11 for the region corresponding to subspace identifier (4,3) are still descendants of the region corresponding to subspace identifier (0,1), and do not therefore change the tree representation.

Since an exact-match query is performed in the two-level dictionary storing exactly n entries, it follows that the search path is determined wholly by the tree representation of the NIBG index. Therefore, the NIBG indexes of each of FIGS. 7, 10, and 11 have the same average retrieval complexity. Therefore, there exists a finite number of distinct search paths for a given number n regions, and for the purpose of average retrieval complexity it follows that the entire infinity of possible NIBG indexes having n regions are embedded into finite number of index directory configurations. While this is described herein with illustrative reference to NIBG indexes, it is generally true for any spatial index that can be represented using a tree representation.

It also follows that for any spatial index that can be represented by a tree representation, the average retrieval complexity is a function of only two parameters: (i) the type of spatial index (which impacts the retrieval complexity for a given index configuration) and (ii) the number of regions n (which impacts the number of tree representations encompassing the infinity of possible index configurations having n regions).

Based upon these observations, a suitable approach estimating an average retrieval complexity measure for the illustrative NIBG index is described. The approach is based on introducing an ordered tree representation for the identifiers set I. An ordered tree representation T is a rooted tree which is embedded in the plain so that the relative order of subtrees is part of its structure. The level of a node y appearing in T is the number of nodes on the path from the root to node y. The root has level 0. The height of an ordered tree T is the maximum level of a node in T. The ordered tree representation T for the identifiers set I is obtained by marking those nodes of decomposition binary tree whose identifiers are in set I (see, e.g., FIG. 7), compressing of this marked decomposition binary tree in such way that unmarked nodes are thrown away and for each marked node an edge connecting the node with its nearest ancestor is created (see FIG. 9). All nodes that have no ancestor are connected to additional node which becomes the root of tree T (see FIG. 9). Viewed another way, the ordered tree T can be viewed as list $S=S_1, \ldots, S_h$ extended with a subset $S_0=\{(0,0)\}$ of whole search space and transformed into the ordered tree in such way that all identifiers in $S \cup S_0$ are taken as nodes and all nearest ancestor links between identifiers of neighbor subsets are taken as edges. The identifiers composing subset $S_i$, $0 \leq i \leq h$, are transformed into nodes of tree T on the level i. FIG. 8 represents the set with eight identifiers extended with nearest ancestor links for example of FIGS. 6 and 7, while FIG. 9 represents ordered tree with nine nodes (eight nodes representing regions plus the root node (0,0)) being the representative for the same example.

As already described with reference to FIGS. 7, 10, and 11, more generally the 9-node tree representation of FIG. 9 represents an infinity of possible NIBG indexes that have n=8 regions conforming to the NIBG partitioning and region-merging rules. However, the 9-node tree representation of FIG. 9 does not represent the entire infinity of possible NIBG indexes that have n=8 regions conforming to the NIBG partitioning and region-merging rules, but only a "sub-infinity" of that infinity. A set of 9-node tree representations are required to encompass the entire infinity of possible NIBG indexes that have n=8 regions conforming to the NIBG partitioning and region-merging rules. However, that set of 9-node tree representations is finite and enumerable. Said another way, each n+1-node ordered tree is a representative for infinite number of sets containing n identifiers. However, the number of all n+1-node ordered trees is finite. It is assumed herein that all the NIBG indexes are uniformly distributed among their representatives and all these representatives have the same probability to appear. This assumption reduces the analysis of all possible NIBG indexes to the analysis of the finite number of their representatives, that is, to the analysis of the finite set of n+1 node ordered tree representations.

Another aspect of the probabilistic model concerns retrieval cost for a given list S containing regions of varying area, volume, or (more generally) spatial size. It is assumed herein that the list S reflects the distribution of spatial database records extant when list S was constructed. The initial NIBG index creation entails partitioning and region merging to combine regions sparsely populated by records. As a result, it is expected that the regions of the initially created NIBG index are substantially uniformly filled with records, typically with the number of records in each region being equal to or close to (but never larger than) the bucket size b. As a result, the probability of finding a record in a small region is the same as the probability of finding a record in a large region. (This statistical condition may change if records are added or deleted after creation of the NIBG index). In other words, all nodes of ordered tree T being the representative for set S are equally likely to be found during the retrieval.

In summary, all n+1-node ordered trees as the representatives of NIBG indexes with n regions as well as all nodes in an ordered tree T when an exact-match query is performed are equally likely.

The total retrieval cost for list S with n regions includes the cost of retrieval of a multidimensional point or record for all regions in S. As the regions are assumed to be equally probable, the total cost for S does not depend on size of regions in S. Moreover, the total cost is completely determined by the nested height h of S and the distribution of subspace identifiers through subsets $S_i$. Further the sizes of the subsets $S_i$ are suitably defined by the number of subspace identifiers in the subsets $S_i$. That is, for a given n+1-node ordered tree T it is sufficient to consider a corresponding list $S=\{S_1, \ldots, S_h\}$, where the size of subset $S_i$ equals to the number of nodes on the level i of T and h is the height of T.

The retrieval cost for a given n+1-node ordered tree T is now considered. Given a n+1-node ordered tree T, the total cost G(S,n) of all possible cases when retrieval algorithm is carried out on the list $S=\{S_1, \ldots, S_h\}$ is to be estimated. The binary search process involved during the retrieval can be naturally represented as a perfect binary tree D of height $\lceil \log_2(h+1) \rceil$; each of h nodes of D, internal or external, uniquely corresponds to some subset $S_i$. Retrieval of a region in subset $S_i$, i=1, ..., h, storing a searching multidimensional point, is carried out along a path $P_i$ in D, which expands from the root of D to the node corresponding to subset Si. One step of the binary search corresponds to descending from a node of D to its child. Within a node of D, it is performed a traversal of balanced tree/B-tree storing the subset $S_i$ with the aim to either find a region storing a searching point or determine the next subset $S_j$ to traverse. Let $f_i=|S_i|$ denote the number of elements in subset $S_i$, and let $g_j$ denote a cost of subset $S_j$ traversal defined in the following way:

$$g_j = \begin{cases} \log_2(f_j+1), & \text{if a balanced tree is used to maintain } S_j, \\ \log_m(f_j+1), & \text{if a } B\text{-tree is used.} \end{cases} \quad (3).$$

Since cost of B-tree traversal equals to that of balanced tree except for a factor $\log_2 m$, the notation $\log(f_i+1)$ will be used for both cases while $\log_2 m$ will still denote the binary search cost.

Figure 12:
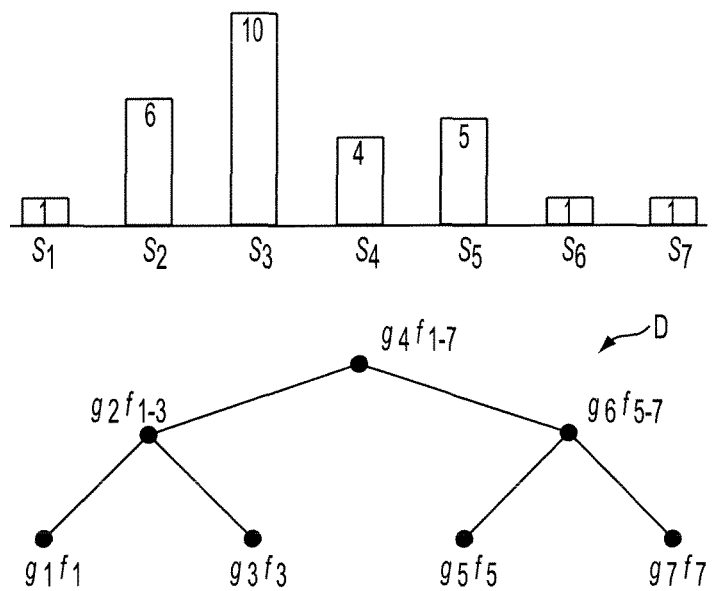
FIG. 12 diagrammatically shows an example of sizes of subsets $S_i$ (upper histogram) and tree D (lower tree structure) for binary searching.

With reference to FIG. 12, an example is diagrammatically illustrated of list S and corresponding tree D. The illustrative list S contains seven subsets $S_i$, i=1, ..., 7 and the number inside each rectangle of the histogram shown in FIG. 12 indicates the size of the corresponding subset $S_i$. For this illustrated example n=28 and h=7. All the nodes of tree D shown in FIG. 12 are labeled with expressions of the form g_f_ whose meaning is as follows. It is apparent that different paths $P_i$ in the tree D have different lengths. For example, if a record to be retrieved is stored in $S_4$, then the binary search completes on the first step. On the other hand, if a record to be retrieved is stored in $S_5$, then the binary search includes three steps, traversing balanced/B-trees storing subsets $S_4$, $S_6$ and $S_5$. Therefore, paths $P_4$ and $P_5$ contribute into the total cost G(S,28) the terms $f_4 \cdot g_4$ and $f_5 \cdot (g_4+g_6+g_5)$ respectively.

Tree D can be also analyzed from point of view of node visitation. Different nodes have different structures of visiting cost expression. For the example of FIG. 12, the subset $S_5$ is visited only if the searching reaches the subset $S_5$ itself. On the other hand, the subset $S_6$ is visited if the searching reaches subsets $S_5$, $S_6$ or $S_7$. Hence, the node of the tree D corresponding to $S_5$ contributes terms $g_5 \cdot f_5$ into the total sum G(S,28), while the node of D corresponding to $S_6$ contributes term $g_6 \cdot (f_5+f_6+f_7)$ This last expression is written in FIG. 12 as $g_6 f_{5-7}$.

In general, the binary search of a given ordered tree representation performs at most $\lceil \log(h+1) \rceil$ steps and starts from subset $$S_{\lceil \frac{h}{2} \rceil}.$$

Let ind(i) denote a set that contains indices of subsets visited during retrieval when a searching point hits subset $S_i$. For the paths $P_4$ and $P_5$ in FIG. 4, it follows that ind(4)={4}, ind(5)={4,5,6}. The total retrieval cost G(S,n) for list S containing n regions (that is to say, for the tree representation defined by list S containing n regions) can be written as follows:

$$G(S, n) = \sum_{i=1}^{h} \left( f_i \sum_{j \in ind(i)} g_j \right). \quad (4)$$

To unify an estimation of retrieval cost the list $S=\{S_1, \ldots, S_h\}$ is extended with empty subsets $S_i=\{\emptyset\}$, i=h+1, ..., n. This extension allows the binary search to start with subsets $S_{h-1}$ and to always be carried out on the interval [1,n] of indices of subsets $S_i$ instead of [1,h]. This extension increases average-case cost at most on O(log n) steps.

Having determined an expression (Equation 4) for the total retrieval cost for a single tree representation, determination of the average retrieval complexity measure for an average NIBG index having n regions entails averaging the retrieval cost for the finite set of tree representations encompassing all possible NIBG indexes having n regions. Denoting by |T| the total number of n+1-node ordered tree representations encompassing all possible NIBG indexes having n regions, the average-case cost ave(n) can be expressed as follows:

$$ave(n) = \frac{1}{|T|} \sum_{\tau=1}^{|T|} G(S^\tau, n) = \frac{1}{|T|} \sum_{\tau=1}^{|T|} \left( \frac{1}{n} \sum_{i=1}^{n} |S_i^\tau| \sum_{j \in ind(i)} \log(|S_j^\tau|+1) \right) \quad (5)$$

or, equivalently, as follows:

$$\text{ave}(n) = \frac{1}{|T|} \sum_{\tau=1}^{|T|} G(S^\tau, n) = \frac{1}{|T|} \sum_{\tau=1}^{|T|} \left( \frac{1}{n} \sum_{i=1}^{n} |S_i^\tau| \sum_{j \in ind(i)} \log(|S_j^\tau| + 1) \right), \quad (6)$$

where list $S^\tau$ and subsets $S^\tau_i$, $i=1, \ldots, n$, are given by $\tau$-th $n+1$-node ordered tree. However, set ind(i) does not depend on $\tau$.

In some embodiments, evaluation of Equation (6) is done by taking advantage of a convexity inequality to determine an upper bound on the average complexity. Since a function of two arguments $z(x,y)=x \log(y+1)$ is convex, the following inequality can be used for a convex function $v(x,y)$ (see, for example, Hardy et al., "Inequalities", Cambridge University Press (1978):

$$v\left( \sum_{\tau=1}^{p} \frac{a_\tau}{p}, \sum_{\tau=1}^{p} \frac{b_\tau}{p} \right) \le \frac{1}{p} \sum_{\tau=1}^{p} v(a_\tau, b_\tau). \quad (7)$$

Using the inequality of Equation (7) with $|S^\tau_i|$ as $a_\tau$, $\log(|S^\tau_i|+1)$ as $b_\tau$ and $|T|$ as p the following is obtained:

$$\text{ave}(n) = \frac{1}{n} \sum_{i=1}^{n} \sum_{j \in ind(i)} \left( \frac{1}{|T|} \sum_{\tau=1}^{|T|} |S_i^\tau| \log(|S_j^\tau|+1) \right) \ge \quad (8)$$

$$\frac{1}{n} \sum_{i=1}^{n} \sum_{j \in ind(i)} \left( \frac{1}{|T|} \sum_{\tau=1}^{|T|} |S_i^\tau| \cdot \log\left( \frac{1}{|T|} \sum_{\tau=1}^{|T|} |S_j^\tau| + 1 \right) \right) =$$

$$\frac{1}{n} \sum_{i=1}^{n} |\overline{S}_i| \sum_{j \in ind(i)} \log(|\overline{S}_j|+1) = \frac{1}{n} G(\overline{S}, n),$$

where $|\overline{S}_i| = \frac{1}{|T|} \sum_{\tau=1}^{|T|} |S_i^\tau|$, $i=1, \ldots, n$ and $\overline{S} = \{\overline{S}_1, \ldots, \overline{S}_n\}$.

In other words, $\overline{T}$ represents the average-case ordered tree with $n+1$ nodes and $\overline{S}_i$ is the number of nodes appearing at level $i$ of $\overline{T}$, $1 \le i \le n$. Therefore, the average-case analysis is reduced to the analysis of the list $\overline{S}$ corresponding to an average-case ordered tree $\overline{T}$.

Each set ind(i) can be calculated using binary representation of i, but this approach does not allow evaluation of $G(\overline{S},n)$ in closed form. To overcome this problem total sum $G(S,n)$ can be rewritten as a matrix $M_S = (m_{ij})$, where element $m_{ij}$ is the cost of the i-th step of the binary search when a region storing a searching point is in subset $S_j$, $1 \le i \le \lceil \log_2(h+1) \rceil$, $1 \le j \le h$. If step i is never performed for subset $S_j$, set $m_{ij}=0$. That is, column j of the matrix M corresponds to cost of path $P_j$ in the tree D. For the example of FIG. 12, the matrix M is as follows (for G(S,28), h=7 with row number k and block semiwidth t):

$$M = \begin{pmatrix} g_4 f_1 & g_4 f_2 & g_4 f_3 & g_4 f_4 & g_4 f_5 & g_4 f_6 & g_4 f_7 \\ g_2 f_1 & g_2 f_2 & g_2 f_3 & 0 & g_6 f_5 & g_6 f_6 & g_6 f_7 \\ g_1 f_1 & 0 & g_3 f_3 & 0 & g_5 f_5 & 0 & g_7 f_7 \end{pmatrix} \begin{matrix} k=2 \; t=3 \\ k=1 \; t=1 \\ k=0 \; t=0 \end{matrix}$$

The sum of the all elements in matrix M gives an alternative representation for G(S,n):

$$G(S, n) = \sum_{i,j} m_{i,j}. \quad (9)$$

In the case of average-case list $\overline{S}$, matrix $M_{\overline{S}}$ contains n columns and $\lceil \log_2(n+1) \rceil$ rows. We renumber rows of matrix $M_{\overline{S}}$ from m to $\lceil \log_2(h+1) \rceil - 1$ starting from the last row (see a column of values for k in the Table 1) and denote as $R_k$ a sum of elements in row k of $M_{\overline{S}}$. Note that row k in matrix M corresponds to level k of tree D. Therefore, the total retrieval cost for list $\overline{S}$ can be rewritten as follows:

$$G(\overline{S}, n) = \sum_{k=0}^{\lceil \log_2(n+1) \rceil - 1} R_k. \quad (10)$$

where each sum $R_k$ consists of $\mu_k$ blocks $B_{k,i}$ (or simply $B_i$), that is:

$$R_k = \sum_{j=1}^{n} m_{kj} = \sum_{i=1}^{\mu_k} B_{k,i} \quad (11)$$

where block $B_{k,i}$ is a sum of i-th sequence of non zero elements in row k. In some instances herein, the notation $B_{k,i}$ is used for both a sequence of non-zero elements in row k and the sum of their values.

Row $k = 0$ has $\lceil \frac{n}{2} \rceil$ blocks while the top row $k = \lceil \log_2(n+1) \rceil - 1$ has exactly one block. Without loss of generality, it is also assumed that n+1 is a power of 2. Therefore, all blocks in the row k have the same number of non-zero elements (that is, the same block width). Then each block $B_{k,i}$ can be expressed with a sum:

$$B_{k,i} = \sum_{j=a_i-t}^{a_i+t} g(a_i) f(j) \quad (12)$$

where $$f(j) = |\overline{S}_j|, \; g(i) = |\log(|\overline{S}_i| + 1)| \quad (13)$$

and where t denotes the block semi-width, $t=2^k-1$; $a_i$ denotes a i-th block center, $$a_i = (t+1)(2i-1), \; i = 1, \ldots, \mu_k, \; \mu_k = \left\lfloor \frac{n+1}{w} \right\rfloor,$$

where block width w equals to 2(t+1). Hence, block $B_i$ of width w covers 2t+1 non-zero elements in row k while one zero element separates two consequent blocks $B_i$ and $B_{i+1}$. Such zero elements is called a i-th hole and its position in the row is $$w \cdot i, i = 1, \ldots, \left\lfloor \frac{n+1}{w} \right\rfloor.$$

In the following, the sums $R_k$ are estimated and it is shown that such sums at least for the lower half of rows of matrix $M_{\tilde{5}}$ have bound $\Omega(n \log n)$. In this section Properties of the average-case n+1-node ordered tree investigated in Kemp, "The Expected Number of Nodes and Leaves at Level K in Ordered Trees", Lect. Notes Comp. Sci. 145, 153-63 (1982) are considered, and two auxiliary lemmas are shown. In the following, ñ is used to denote n+1.

Figure 13:
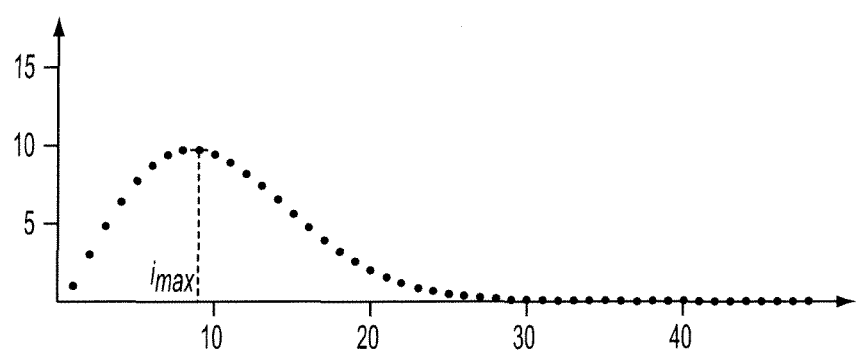
FIG. 13 plots a main part of a sequence f(i) disclosed herein, with a peak value $i_{max}$ indicated, for ñ=128.

With reference to FIG. 13, a first lemma (Lemma 1) is shown. Assuming that all ñ-node ordered trees are equally likely, the average number of nodes appearing at level i is given by:

$$f(i) = \tilde{n} \frac{2i-1}{2\tilde{n}-1} \binom{2\tilde{n}-1}{\tilde{n}-i} / \binom{2\tilde{n}-2}{\tilde{n}-1} = (2i-1)\frac{(\tilde{n}-1) \ldots (\tilde{n}-i+1)}{(\tilde{n}+1) \ldots (\tilde{n}+i-1)}, \quad (14),$$

asymptotically for all $\epsilon > 0$ is given by:

$$f(i) = \left(2i - 1 + \frac{2i^2}{\tilde{n}} + O(\tilde{n}^{-1/2+\epsilon})\right) e^{-i^2/\tilde{n}}; \quad (15),$$

Additionally, the level $i_{max}$ which contains most nodes in all ordered trees is given by $i_{max} = \lfloor \sqrt{\tilde{n}/2} \rfloor + 1$ FIG. 13 shows the main part of f(i) along with a corresponding $i_{max}$ for ñ=128. A second lemma (Lemma 2) is shown as follows. The sequences f(i) (see Kemp, "The Expected Number of Nodes and Leaves at Level K in Ordered Trees", Lect. Notes Comp. Sci. 145, 153-63 (1982)) and $g(i) = \log(f(i)+1), i=1, \ldots, \tilde{n}$ have the following properties: (1) they increase for $0 < i < i_{max}$; (2) they decrease for $i_{max} < i < \tilde{n}$; and (3) for all q, $1 < q < i_{max}-1$, $f((i_{max}-1-q) < f(i_{max}+q), g(i_{max}-1-q) < g(i_{max}+q)$. These properties can be demonstrates as follows. The first two properties for f(i) are consequences of the first lemma (Lemma 1). To show property the third property, a difference of sequence f(i) is constructed:

$$\Delta f(i) = f(i) - f(i-1) = \frac{(\tilde{n}-1) \ldots (\tilde{n}-i+2)}{(\tilde{n}+1) \ldots (\tilde{n}+i-1)}(-4i^2 + 8i - 4 - 2\tilde{n}). \quad (16).$$

Then, difference of differences defined as:

$$\Delta^2 f(i) = \Delta f(i) - \Delta f(i-1) == \quad (17)$$
$$\frac{(\tilde{n}-1) \ldots (\tilde{n}-i+3)}{(\tilde{n}+1) \ldots (\tilde{n}+i-1)} 2(4i^3 - 18i^2 + 26i - 6i\tilde{n} + 9\tilde{n} - 12)$$

which is an integer analogy to the second derivative of a real argument function. The fraction in Equation (17) is always positive and the polynomial $4x^3 - 18x^2 + 26x - 6x \cdot \tilde{n} + 9\tilde{n} - 12$ has two positive roots $$x_1 = \frac{3}{2} \text{ and } x_2 = \frac{3}{2} + \sqrt{6\tilde{n}-1}$$

and is positive on the open interval $]x_1, x_2[$. Therefore, taking two points which are stayed on the same distance q from $i_{max}$, $q < i_{max}$ and passing to integer argument the following is obtained: $\Delta f(i_{max}-q-1) < -\Delta f(i_{max}+q)$, $1 < q < i_{max}-1$. Therefore, f(i) in the point $i_{max}-q-1$ increases faster than decreases in the point $i_{max}+q$. Hence, $f(i_{max}-q-1) < f(i_{max}+q)$. Sequence g(i) has the same properties because function $\log_2(x+1)$ is an increasing function for all x>0 and therefore, $x_1 > x_2 \Rightarrow \log(x_1+1) > \log(x_2+1)$.

A third lemma (Lemma 3) is as follows. If sequence f(i) is given by Kemp, "The Expected Number of Nodes and Leaves at Level K in Ordered Trees", Lect. Notes Comp. Sci. 145, 153-63 (1982), then:

$$\sum_{i=1}^{\left\lceil \sqrt{\frac{\tilde{n}}{8}} \right\rceil} f(i) \lceil \log(f(i)+1) \rceil dx = \Omega(n \log n). \quad (18).$$

This can be shown as follows. Using asymptotical view (see, for example, Lin et al., "Perfect KDB-Tree: A Compact KDB-Tree Structure for Indexing Multidimensional Data", in Proc. $3^{rd}$ Intern. Conference on Information Technology and Applications, Vol. 2, 411-14 (2005)) and converting the sum to an integral, the following is obtained:

$$\sum_{i=1}^{\left\lceil \sqrt{\frac{\tilde{n}}{8}} \right\rceil} f(i) \lceil \log(f(i)+1) \rceil dx > \quad (19).$$
$$\int_0^{\sqrt{\frac{\tilde{n}}{8}}} (2x + O(1)) e^{-x^2/\tilde{n}} \log((2x + O(1)) e^{-x^2/\tilde{n}} + 1) dx =$$
$$\int_0^{} 2x e^{-x^2/\tilde{n}} \log(2x e^{-x^2/\tilde{n}} + 1) dx +$$
$$O(1) \int_0^{} e^{-x^2/\tilde{n}} \log(2k e^{-x^2 \tilde{n}} + 1) dx = I_1 + O(\tilde{n}).$$

To calculate $I_1$ the substitution $$t = \frac{x^2}{\tilde{n}}$$

is used, and the integral by parts is taken ($c_1$ denotes a constant for $$\frac{1}{\ln 2} \text{ or } \frac{1}{\ln m}$$

when a balanced or B-tree is considered):

$$I_1 = c_1 \int_0^{\sqrt{\frac{\tilde{n}}{8}}} 2x e^{-x^2/\tilde{n}} \ln(2x e^{-x^2/\tilde{n}} + 1) dx = \quad (20)$$
$$c_1 \tilde{n} \int_0^{\frac{1}{8}} e^{-t} \ln(2\sqrt{\tilde{n}t} \, e^{-t} + 1) dt =$$

-continued $$c_1\tilde{n}\left(-e^{-t}\ln(2\sqrt{\tilde{n}t}\,e^{-t}+1)\,|_0^{\frac{1}{8}}\right) + \int_0^{\frac{1}{8}} e^{-2t}\frac{\sqrt{\tilde{n}}}{\sqrt{t}}\frac{1-2t}{2\sqrt{\tilde{n}t}\,e^{-t}+1}dt >$$

$$c_1\tilde{n}\int_{\frac{2}{\tilde{n}}}^{\frac{1}{8}} e^{-t}\left(\frac{1}{t}-2\right)\frac{1}{2+\frac{e^t}{\sqrt{\tilde{n}t}}}dt = \dots$$

Note that last step is valid for $\tilde{n} > 16$. Then, $0 < e^t < \sqrt{\tilde{n}t}$ on the interval $$\left[\frac{2}{\tilde{n}}, \frac{1}{8}\right].$$

Hence, there exists an $\tilde{n}$ constant $c_2$, $1/3 \leq c_2 \leq 1/2$, such that:

$$\dots = c_1 c_2 \tilde{n} \int_{\frac{2}{\tilde{n}}}^{\frac{1}{8}} e^{-t}\left(\frac{1}{t}-2\right)dt = c\tilde{n}\left(E_1(2/\tilde{n}) - E_1(1/8) + 2e^{-t}\,|_{\frac{2}{\tilde{n}}}^{\frac{1}{8}}\right) = \dots \quad (21)$$

holds, where $$E_1(x) = \int_x^\infty \frac{e^{-t}}{t}dt$$

is a standard exponential integral (see, for example, Abramowitz et al., ed., "Handbook of Mathematical Functions", U.S. Department of Commerce, 1972), which has a following property:

$$\ln\left(1+\frac{1}{x}\right) > e^x E_1(x) > \frac{1}{2}\ln\left(1+\frac{2}{x}\right), x > 0, \quad (22)$$

that in the present instance yields $$E_1\left(\frac{2}{\tilde{n}}\right) = \Theta(\log \tilde{n}) \text{ and } E_1(1/8) = \Theta(1).$$

Hence, the calculation can be completed as follows:

$$\dots = c\tilde{n}\left(\Theta(\log\tilde{n}) - \Theta(1) + 2e^{-\frac{1}{8}} - 2e^{-\frac{2}{\tilde{n}}}\right) = \Theta(\tilde{n}\log\tilde{n}), \quad (23)$$

that is, $I_1 = \Omega(n \log n)$ that proves the lemma.

Estimation of the sum $R_k$ is next addressed. It is shown here that at least one-half of the sums $R_k$ in the matrix $M_{\overline{S}}$ are bounded with $\Omega(n \log n)$. A first theorem (Theorum 1) can be shown, namely that $R_k = \Omega(n \log n)$ for all k. To demonstrate this, $R_k$ are estimated for the row k' of $M_{\overline{S}}$ which has minimal block width $w' > i_{max}$. For row r' it follows $$w' \geq ((n+1)/2)^{1/2}, w'/2 < ((n+1)/2)^{1/2},$$

$$t' = \frac{w'}{2} - 1 \geq \frac{1}{2}((n+1)/2)^{1/2} - 1$$

and $$k' = \log(t'+1) \geq \frac{1}{2}\log\left(\frac{n+1}{2}\right) - 1.$$

In order to show the bound $\Omega(n \log n)$ for this row it is sufficient to calculate the value of first block:

$$R_{k'} > B_{k',1} \geq \int_0^{((n+1)/2)^{1/2}} g\left(\frac{1}{2}((n+1)/2)^{1/2}+1\right)f(x)dx = \quad (24)$$

$$\Theta(1)g\left(\frac{1}{2}((n+1)/2)^{1/2}+1\right)\int_0^{((n+1)/2)^{1/2}} 2xe^{\frac{-x^2}{n+1}}dx =$$

$$\Theta(\log n)(n+1)e^{\frac{-x^2}{n+1}}\,|_0^{((n+1)/2)^{1/2}} = \Theta(n\log n).$$

$R_k$ is estimated for all k, $0 \leq k < k'$ as follows. Each such sum has more than one block on the interval $[0, i_{max}]$. Let r denote the number of blocks $B_i$ in the k-th row which are completely contained in interval $[1, i_{max}]$, i.e., $w \cdot r \leq i_{max} < w \cdot (r+1)$. Since $k < k'$ and k' is the lowest row where no block is contained in $[1, i_{max}]$, then $r \geq 1$. One approach is to exchange the sum of blocks $$B_i = \sum_{j=a_i-t}^{a_i+t} g(a_i)f(j)$$

composing sum $R_k$ with sum $$\sum_{j=1}^{\alpha} g(j)f(j)$$

with value of $\alpha$ such that Lemma 3 can be applied. A block $B_i$ is represented as a sum of two terms $B_i = B_i^- + B_i^+$, where:

$$B_i^- = \sum_{j=a_i-t}^{a_i} g(a_i)f(j) = \sum_{j=0}^t g(a_i)f(a_i-j), \quad (25)$$

$$B_i^+ = \sum_{j=a_i+1}^{a_i+j} g(a_i)f(j) = \sum_{j=1}^t g(a_i)f(a_i+j).$$

By analogy with $B_i$ the term $W_i$ can be written as a sum:

$$W_i = \sum_{j=a_i-t}^{a_i+t} g(j)f(j), \quad (26)$$

where $a_i$ is the center of block $B_i$, that is $$t = 2^k - 1, a_i = (t+1)(2i-1), i = 1, \dots, \left\lfloor\frac{n+1}{w}\right\rfloor.$$

The sum $W_i$ can also be represented as a sum $W_i = W_i^- + W_i^+$, where:

$$W_i^- = \sum_{j=a_i-t}^{a_i} g(j)f(j) = \sum_{j=0}^{t} g(a_i - j)f(a_i - j), \quad (27)$$

and $$W_i^+ = \sum_{j=a_i+1}^{a_i+t} g(j)f(j) = \sum_{j=0}^{t} g(a_i + j)f(a_i + j). \quad (28)$$

A sequence of inequalities can be shown based on the foregoing, which indicate relations between $B_i^-$, $B_i^+$, $W_i^-$, $W_i^+$ the interval $[1, i_{max}]$ and determine the elements from sum $R_k$ covering those elements from $$\sum_{j=1}^{a} g(j)f(j)$$

which correspond to the holes between blocks $B_i$, $1 \leq i \leq r$. The last inequality makes crucial evaluation of sum $R_k$. First, $B_i^- > W_i^-$, $i=1, \ldots, r$. To show this, from the second lemma (Lemma 2) $g(a_i) \geq g(a_i-j)$, $a_i \leq i_{max}$, $j=1, \ldots, t$ and:

$$B_i^- = \sum_{j=0}^{t} g(a_i)f(a_i - j) > \sum_{j=0}^{t} g(a_i - j)f(a_i - j) = W_i^-. \quad (29)$$

Second, $B_i^+ > W_{i-1}^+$, $i=1, \ldots, r$. Since $f(a_1+j) > f(a_i-w+j)$, and $g(a_i) > g(a_i-w+j)$, $i=1, \ldots, r$, $j=1, \ldots, t$, it follows that:

$$B_i^+ = \sum_{j=1}^{t} g(a_i)f(a_i + j) > \sum_{j=1}^{t} g(a_i - w + j)f(a_i - w + j) = W_{i-1}^+. \quad (30)$$

Third, $B_{r+1}^- > W_r^+$. To show this, consider that point $i_{max}$ is either a point of block $B_{r+1}$ or the hole between blocks $B_r$ and $B_{r+1}$. Two obvious cases are possible. If $i_{max} \geq a_{r+1}$, then evaluation similar to the previous two inequalities is suitably performed. Otherwise, if $i_{max} < a_{r+1}$, property (3) of the second lemma (Lemma 2) can be applied.

Using these three inequalities: $B_i^- > W_i^-$, $i=1, \ldots, r$; $B_i^+ > W_{i-1}^+$, $i=1, \ldots, r$; and $B_{r+1}^- > W_r^+$, a fourth inequality can be shown, namely:

$$\sum_{i=1}^{r} B_i + B_{r+1}^- > \sum_{i=1}^{r} W_i.$$

Indeed, it can be shown:

$$\sum_{i=1}^{r} B_i + B_{r+1}^- > B_1^- + \sum_{i=2}^{r} (B_i^- + B_i^+) + B_{r+1}^- > \quad (31)$$

$$W_1^- + \sum_{i=2}^{r} (W_i^- + W_{i-1}^+) + W_r^+ = \sum_{i=1}^{r} W_i.$$

Finally, it follows that $g(a_{r+1})f(a_{r+1}) \geq g(w \cdot (r-i))f(w \cdot (r-i))$, $i=1, \ldots, r-1$. From the second lemma (Lemma 2) and $a_i > 1$ it follows that $f(a_{r+1}) > f(a_r)$, and in general $f(a_{r+1}) > f(a_{r-i+1})$, $i=1, \ldots, r-1$. Since $f(i)$ increases on $[1, i_{max}]$ and $(r-i+1)$-th block center lies on the right of $(r-i)$-th hole, then $a_{r-i+1} > w(r-1)$ implies $f(a_{r+i}) > f(w(r-1))$. The same consideration is valid for $g(i)$.

Lastly, it is noted that $2r < \mu k$. In view of this, the fourth inequality $$\sum_{i=1}^{r} B_i + B_{r+1}^- > \sum_{i=1}^{r} W_i$$

can be used to exchange blocks $B_i$ in sum $R_k$ by $W_i$ and the last inequality (Equation (31)) can be used to cover holes between sums $W_i$. The final evaluation is:

$$R_k > \sum_{i=1}^{2r} B_i > \sum_{i=1}^{r} B_i + B_{r+1}^- + \sum_{i=1}^{r-1} g(a_{r+i})f(a_{r+i}) > \quad (32)$$

$$\sum_{i=1}^{r} W_i + \sum_{i=1}^{r-1} g(w \cdot (r-i))f(w \cdot (r-i)) =$$

$$\sum_{i=1}^{r} \sum_{j=a_i-t}^{a_i+t} g(j)f(j) + \sum_{i=1}^{r-1} g(w \cdot (r-i))f(w \cdot (r-i)) =$$

$$\sum_{j=1}^{w \cdot r - 1} g(j)f(j) > \ldots.$$

Recall that r is the number of blocks that are completely contained in interval $[1, i_{max}]$. Therefore, point $w \cdot r - 1$ is the last element of block $B_r$. Since $$k < k' \text{ and } w \leq \frac{w'}{2}, \text{ then } w \cdot r - 1 > i_{max} - w \geq \left\lceil \frac{1}{2}((n+1)/2)^{1/2} \right\rceil.$$

By the third lemma (Lemma 3) the following is obtained:

$$\ldots > \sum_{j=1}^{\lceil ((n+1)/2)^{1/2} \rceil} f(j)g(j) = \Omega(n \log n). \quad (33)$$

It follows that $R_k = \Omega(n \log n)$.

Finally, a second theorem (Theorem 2) can be shown, namely that the average-case cost for retrieval on NIBG file is $\Theta((\log^2 n))$. To show this, it is recognized that the first theorem (Theorem 1) indicates that for each row $$k, 0 \leq k \leq \frac{1}{2}\log\left(\frac{n+1}{2}\right) - 1$$

of matrix $M_{\bar{S}}$ the sum $R_k$ has a bound $\Omega(n \log n)$. Summing all $R_k$ the following is obtained:

$$\text{ave}(n) \geq \frac{1}{n}G(\bar{S}, n) = \frac{1}{n}\sum_{k=0}^{\lceil \log(n+1) \rceil - 1} \quad (34)$$

-continued $$R_k = \frac{\Theta(\log n)}{n} \Omega(n \log n) = \Omega(\log^2 n)$$

since the worst-case bound is $O(\log^2 n)$, it can be inferred that the average case is $\Theta(\log^2 n)$. There is a corollary to this second theorem (that is, to Theorem 2), namely that if B-trees of order m are used for storing subsets $S_j$, the average-case cost for retrieval on NIBG file is $\Theta(\log_m n \log n)$.

In the foregoing illustrative average retrieval complexity measure computation, illustrative NIBG indexes have been considered. These indexes have direct equivalence to random ordered trees, and so the analysis principally addresses estimating the average-case ordered trees. The disclosed average retrieval complexity measure approach is also applicable for other spatial indexes that define spatial regions whose indexing can be represented by nodes of a tree structure. For some such spatial indexes, determination of the finite set of tree representations may be less straightforward than is the case for NIBG indexes. Determination of the finite set of ordered tree representations is straightforward for spatial index types that use space partition principles the same or similar to those used by NIBG indexes, such as quadtrees, k-d-trees, and bucket trees.

As already noted, the average retrieval complexity estimation techniques herein demonstrate that the average retrieval complexity measure is generally a function only of the type of spatial index and the number of regions n. Accordingly, the functions of the probabilistic spatial index modeler 30 and the average retrieval complexity measure computation module 32 (see FIG. 1) can optionally be performed "off-line" for a representative number of regions to generate functions dependent upon n or look-up tables indexed by n that provide the average retrieval complexity measure for different types of spatial indexes and for anticipated ranges of the number of regions n.

In a variant embodiment of the illustrative spatial information system of FIG. 1, the spatial index selection module 20 may be replaced by a set of average retrieval complexity formulas, look-up tables, or the like that have a "black box" equivalency to the spatial index selection module 20 shown in FIG. 1. Such formulas, tables, or the like are suitably generated by the digital processors configured to perform the functions of the probabilistic spatial index modeler 30 and the average retrieval complexity measure computation module 32, but it is contemplated for such processing to be performed "off-line" and not included in the storage medium or system embodying the overall system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-performed method for recommending a spatial index for a spatial database, the method comprising:
    modeling a spatial index type comprising partitioning and region-merging rules for defining n spatial regions in a multidimensional space, the modeling using a tree-based model that represents an infinite number of arrangements of n spatial regions in the multidimensional space allowable by the spatial index type by a finite number of tree representations;
    computing an average retrieval complexity measure for content retrieval using the spatial index type based on the tree-based model; and
    providing a recommendation of a spatial index type based on the average retrieval complexity measure.

2. The computer-performed method as set forth in claim 1, further comprising repeating the modeling and computing for a plurality of different spatial index types, the providing comprising:
    recommending one of the plurality of different spatial index types for indexing the spatial database, the recommending being based on the average retrieval complexity measures computed for the plurality of different spatial index types.

3. The computer-performed method as set forth in claim 1, further comprising:
    computing n based on a number of records in the spatial database and a bucket size b of the spatial index.

4. The computer-performed method as set forth in claim 3, wherein the modeling generates an average retrieval complexity formula functionally dependent upon the number of spatial regions and a data distribution, and the computing comprises:
    computing the average retrieval complexity measure by evaluating the average retrieval complexity formula with the number of spatial regions set to the computed n.

5. The computer-performed method as set forth in claim 4, further comprising repeating the modeling and computing for a plurality of different spatial index types to generate an average retrieval complexity measure for each of the plurality of different spatial index types, the providing comprising:
    recommending one of the plurality of different spatial index types for indexing the spatial database based on the average retrieval complexity measures.

6. The computer-performed method as set forth in claim 1, wherein the spatial index type comprises a nested interpolation-based grid spatial index type.

7. The computer-performed method as set forth in claim 6, wherein the computing an average retrieval complexity measure comprises:
    determining an upper bound on the retrieval complexity measure; and
    evaluating the upper bound to compute the average retrieval complexity measure.

8. The computer-performed method as set forth in claim 1, wherein the computing an average retrieval complexity measure comprises:
    averaging the finite number of tree representations to generate an average tree representation; and
    computing the average retrieval complexity measure for the average tree representation.

9. A non-transitory storage medium storing instruction executable by a digital electronic device to perform a method for assessing average retrieval complexity when using a selected spatial index that decomposes a multidimensional space into a selected number of spatial regions, the method comprising:
    modeling an infinity of arrangements of the selected number of spatial regions which are allowed by the selected spatial index using a finite number of tree representations; and
    computing an average retrieval complexity measure indicative of average retrieval complexity based on the tree-based model.

10. The non-transitory storage medium storing as set forth in claim 9, wherein the computing includes (i) averaging the finite number of tree representations to generate an average tree representation and (ii) computing an average retrieval complexity measure for content retrieval using the average tree representation.

11. The non-transitory storage medium as set forth in claim 9, wherein the storage medium further stores instructions executable by a digital electronic device to (i) invoke the method for assessing average retrieval complexity respective to a plurality of different selected spatial indices to computing average retrieval complexity measures for the different selected spatial indices and (ii) choose one of the different selected spatial indices for use in indexing a spatial database and (iii) associate a retrieval routine to the selected spatial index.

12. The non-transitory storage medium as set forth in claim 11, wherein the storage medium further stores instructions executable by a digital electronic device to (iv) construct a directory that indexes the spatial database using the chosen spatial index.

13. The non-transitory storage medium as set forth in claim 11, wherein the storage medium further stores instructions executable by a digital electronic device to select the number of spatial regions based on a number of records in the spatial database and a bucket size indicative of a maximum number of records allowable in a single spatial region.

14. The non-transitory storage medium as set forth in claim 11, wherein the plurality of different selected spatial indices include at least one spatial index selected from the group consisting of a quadtree index, and octree index, a UB-tree index, an R-tree index, a k-d tree index, and a nested interpolation-based grid (NIBG) index.

15. A spatial information system comprising:
a computer programmed to define:
an indexing module configured to construct a directory indexing records of a spatial database using a spatial index defining spatial regions whose indexing can be represented by nodes of a tree structure, and
a spatial index selection module configured to select a spatial index for use by the directory construction module based on average retrieval complexity measures for candidate spatial indices that are functionally dependent upon a number of spatial regions to be defined by the spatial index.

16. The spatial information system as set forth in claim 15, wherein the spatial index selection module is configured to compute the average retrieval complexity measures for the candidate spatial indices based on functions relating the average retrieval complexity measures for the candidate spatial indices to the number of spatial regions.

17. The spatial information system as set forth in claim 16, wherein the spatial index selection module is configured to compute the average retrieval complexity measure for each candidate spatial index by a method including (i) modeling an infinity of arrangements of the spatial regions allowed by the candidate spatial index using a finite number of tree representations, and (ii) determine the average retrieval complexity measure for the candidate spatial index based on the finite number of tree representations.

18. The spatial information system as set forth in claim 17, wherein the spatial index selection module is configured to perform the determination operation (ii) by averaging the finite number of tree representations to generate an average tree representation and determining the average retrieval complexity measure for the average tree representation.

19. The spatial information system as set forth in claim 15, wherein the spatial index selection module is configured to select a spatial index for use by the directory construction module from a plurality of candidate spatial indices including at least a nested interpolation-based grid spatial index.

\* \* \* \* \*